(12) United States Patent
Shirakawa et al.

(10) Patent No.: US 9,590,246 B2
(45) Date of Patent: Mar. 7, 2017

(54) METHOD FOR PRODUCING LITHIUM METAL PHOSPHATE

(75) Inventors: Akihiko Shirakawa, Tokyo (JP); Isao Kabe, Tokyo (JP); Akihisa Tonegawa, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 241 days.

(21) Appl. No.: 13/820,388

(22) PCT Filed: Sep. 2, 2011

(86) PCT No.: PCT/JP2011/004948
§ 371 (c)(1),
(2), (4) Date: May 20, 2013

(87) PCT Pub. No.: WO2012/029329
PCT Pub. Date: Mar. 8, 2012

(65) Prior Publication Data
US 2013/0236385 A1    Sep. 12, 2013

(30) Foreign Application Priority Data

Sep. 3, 2010  (JP) ................. 2010-198303

(51) Int. Cl.
*C01B 25/45*    (2006.01)
*H01M 4/58*    (2010.01)

(52) U.S. Cl.
CPC ........... *H01M 4/5825* (2013.01); *C01B 25/45* (2013.01)

(58) Field of Classification Search
CPC .............................. C01B 25/45; H01M 4/5825
See application file for complete search history.

(56) References Cited

U.S. PATENT DOCUMENTS

| 2009/0117022 | A1 | 5/2009 | Nuspl et al. |
| 2009/0184296 | A1 | 7/2009 | Isono et al. |
| 2010/0133467 | A1 | 6/2010 | Ikegawa |
| 2010/0233540 | A1* | 9/2010 | Choy ............... C01B 25/45 429/220 |

FOREIGN PATENT DOCUMENTS

| CN | 101279727 A | 10/2008 |
| CN | 101740756 A | 6/2010 |
| JP | 2007-119304 A | 5/2007 |
| JP | 2008-532910 A | 8/2008 |
| WO | 2008/105490 A1 | 9/2008 |

OTHER PUBLICATIONS

Barpanda et al, "Ionothermal Synthesis and Electrochemical Characterization of Nanostructured Lithium Manganese Phosphates" ECS Transactions vol. 25, Issue 14, pp. 1-7 (2010).*
Chen, J. et al., "The hydrothermal synthesis and characterization of olivines and related compounds for electrochemical applications", Solid State Ionics, (2008), vol. 178, No. 31-32, XP022388037, pp. 1676-1693.
Communication dated Jul. 5, 2016 from the European Patent Office in counterpart Application No. 11821348.7.

* cited by examiner

*Primary Examiner* — Richard M Rump
(74) *Attorney, Agent, or Firm* — Sughrue Mion, PLLC

(57) ABSTRACT

Provided is a method for producing a lithium metal phosphate, and the method comprises initiating and allowing to proceed, in the presence of a polar solvent, a conversion reaction of a lithium ion ($Li^+$) source such as lithium hydroxide, a divalent transition metal ion ($M^{2+}$) source such as a divalent transition metal sulfate, and a phosphate ion ($PO_4^{3-}$) source such as phosphoric acid into a lithium metal phosphate at 150° C. or higher. The conversion reaction is initiated and allowed to proceed by bringing solution A containing one of a lithium ion, a divalent transition metal ion, and a phosphate ion into contact with solution B containing the others of these ions at 150° C. or higher, or by adjusting the pH of solution C that has a pH of lower than 4 and contains a lithium ion, a divalent transition metal ion, and a phosphate ion to 4 or higher.

5 Claims, No Drawings

METHOD FOR PRODUCING LITHIUM METAL PHOSPHATE

TECHNICAL FIELD

The present invention relates to a method for producing a lithium metal phosphate. More specifically, the present invention relates to a method for producing a lithium metal phosphate useful as a cathode active material that can improve the capacity of a lithium-ion battery.

BACKGROUND ART

Lithium metal phosphates represented by the chemical formula $LiMPO_4$ and the like are known to be less expensive and to provide a safer battery than $LiCoO_2$, and therefore are expected to serve as a cathode active material for use in a lithium-ion battery, in particular as a cathode active material for use in a large battery to be mounted on an automobile or the like.

Known methods for producing a lithium metal phosphate include solid phase synthesis, coprecipitation and calcination, glass crystallization, hydrothermal synthesis, and the like. Among these, hydrothermal synthesis is excellent because it can provide a lithium metal phosphate having a small particle diameter, which is suitable for a cathode active material for use in a lithium-ion battery.

Patent Document 1 discloses a method for producing lithium iron phosphate, and the method comprises placing lithium phosphate and iron (II) chloride tetrahydrate as well as distilled water in a pressure-resistant container, which is then subjected to substitution with argon gas, is hermetically sealed, and is heated in an oil bath at 180° C. to allow a reaction to proceed. Also disclosed is that a lithium-ion battery comprising the lithium iron phosphate obtained by the method had a discharge capacity of 3.38 mAh.

Patent Document 2 discloses a method for producing lithium iron phosphate, and the method comprises placing an aqueous solution containing ferrous sulfate heptahydrate and phosphoric acid in an autoclave and injecting thereto an aqueous solution containing lithium hydroxide, followed by heating the resultant at 50° C., performing nitrogen purge, and raising the temperature to 160° C. for hydrothermal treatment at 160° C.

Patent Document 3 discloses a method for producing a lithium metal phosphate, and the method comprises step a to subject lithium phosphate, a divalent metal salt, and an acidic phosphate source to a reaction in a polar solvent to produce a suspension of phosphate containing the divalent metal, step b to add a basic lithium source to the suspension obtained in step a to obtain precipitate, and step c to convert the precipitate obtained in step b into a lithium metal phosphate. Patent Document 3 discloses that in step a, the pH of the mixture is raised from lower than 2 to the range of 2 to 6, and in step b, the pH of the mixture is raised to the range of 6 to 8. Patent Document 3 also discloses that in step a and step b, the temperature is maintained at 5° C. to 80° C., and in step c, a hydrothermal synthesis reaction is carried out at a temperature of 100° C. to 250° C.

PRIOR ART LIST

Patent Document

Patent Document 1: JP 2002-151092 A
Patent Document 2: JP 2007-511458 A
Patent Document 3: JP 2008-532910 A
Patent Document 4: JP 2010-40272 A
Patent Document 5: JP 2010-170997 A Non-Patent Document Non-patent Document 1: Solid State Ionics 178 (2008), p. 1680-1681

SUMMARY OF THE INVENTION

Problems to be Resolved by the Invention

A lithium-ion battery comprising the lithium iron phosphate obtained by the method described in each of Patent Documents 1, 2, and 3 had a discharge capacity that was insufficient for use in, for example, a large battery in an automobile or the like.

The object of the present invention is to provide a method for producing a lithium metal phosphate useful as a cathode active material. The other object of the present invention is to provide a method for producing a lithium-ion battery with a large capacity.

Means for Solving the Problems

In the method described in each of Patent Documents 1, 2, and 3, the reaction is carried out by mixing a lithium ion source, an iron ion source, and a phosphate ion source at around room temperature, and then gradually raising the temperature to the range of 160 to 180° C. As described in Patent Document 2, lithium iron phosphate starts to form when the temperature of hot water exceeds about 110° C. Non-patent Document 1, however, discloses that when the temperature of hot water is low, a divalent transition metal ion occupies a lithium site, and therefore a lithium metal phosphate to be obtained is high in lithium site occupancy by a divalent transition metal ion.

The inventors of the present invention inferred that the lithium iron phosphate obtained by the method described in Patent Document 1 or the like does not provide a lithium-ion battery with a large capacity because the lithium site occupancy by a divalent transition metal ion is high in a great proportion of the lithium metal phosphate contained in the cathode active material. In view of this, the inventors of the present invention prepared a lithium ion source, a divalent transition metal ion source, and a phosphate ion source so as not to practically cause a hydrothermal synthesis reaction at lower than 150° C. and controlled the hydrothermal synthesis reaction to be initiated and proceed at 150° C. or higher, thereby finding that the resulting lithium metal phosphate had significantly less transition metal ions occupying a lithium site. In addition, they found that a lithium-ion battery comprising the lithium metal phosphate had a large discharge capacity. They have conducted further studies based on these findings and have now completed the present invention.

The present invention includes the following embodiments.

[1] a method for producing a lithium metal phosphate comprising initiating and allowing to proceed, in the presence of a polar solvent,
a conversion reaction of a lithium ion ($Li^+$) source, a divalent transition metal ion ($M^{2+}$) source, and a phosphate ion ($PO_4^{3-}$) source into a lithium metal phosphate at 150° C. or higher.

[2] the method for producing a lithium metal phosphate according to [1] further comprising preparing the lithium ion (Li$^+$) source, the divalent transition metal ion (M$^{2+}$) source, and the phosphate ion (PO$_4^{3-}$) source so as not to practically cause the conversion reaction into a lithium metal phosphate at lower than 150° C.

[3] the method for producing a lithium metal phosphate according to [1] or [2] in which the conversion reaction is initiated and allowed to proceed by bringing solution A containing one of a lithium ion, a divalent transition metal ion, and a phosphate ion into contact with solution B containing the others of these ions at 150° C. or higher.

[4] the method for producing a lithium metal phosphate according to [3] in which solution A contains a lithium ion and solution B contains a divalent transition metal ion and a phosphate ion.

[5] the method for producing a lithium metal phosphate according to [3] in which solution A contains a phosphate ion and solution B contains a divalent transition metal ion and a lithium ion.

[6] the method for producing a lithium metal phosphate according to [3] in which solution A contains a divalent transition metal ion and solution B contains a phosphate ion and a lithium ion.

[7] the method for producing a lithium metal phosphate according to [1] or [2] in which the conversion reaction is initiated and allowed to proceed by adjusting the pH of solution C that has a pH of lower than 4 and contains a lithium ion, a divalent transition metal ion, and a phosphate ion to 4 or higher.

[8] the method for producing a lithium metal phosphate according to [7] in which adjusting the pH of solution C to 4 or higher is achieved by adding a liquid having a pH of 9 or higher to solution C.

[9] The method for producing a lithium metal phosphate according to [8] in which the liquid having a pH of 9 or higher is a liquid containing ammonia, an amine, or lithium hydroxide.

[10] the method for producing a lithium metal phosphate according to any one of [1] to [9] in which the lithium ion source is lithium hydroxide.

[11] the method for producing a lithium metal phosphate according to any one of [1] to [10] in which the phosphate ion source is phosphoric acid.

[12] the method for producing a lithium metal phosphate according to any one of [1] to [11] in which the divalent transition metal ion source is a divalent transition metal sulfate.

[13] the method for producing a lithium metal phosphate according to any one of [1] to [12] in which the divalent transition metal ion is at least one selected from the group consisting of an iron ion and a manganese ion.

[14] the method for producing a lithium metal phosphate according to any one of [1] to [13] in which the divalent transition metal ion source is iron (II) sulfate, an iron (II) sulfate hydrate, manganese (II) sulfate, and/or a manganese (II) sulfate hydrate.

[15] the method for producing a lithium metal phosphate according to any one of [1] to [14] in which the lithium ion source or the divalent transition metal ion source is lithium phosphate or a divalent transition metal phosphate.

[16] the method for producing a lithium metal phosphate according to any one of [1] to [15] in which the conversion reaction is carried out under a pressure of 0.5 MPa or higher.

[17] the method for producing a lithium metal phosphate according to any one of [1] to [16] in which the polar solvent is water.

[18] a method for producing a cathode material for use in a lithium-ion battery comprising producing a lithium metal phosphate by the method as described in any one of [1] to [17].

[19] the method for producing a cathode material for use in a lithium-ion battery according to [18] further comprising mixing the lithium metal phosphate with a carbon-containing substance, a conductive substance, or a precursor thereof, and calcining the mixture under an inert condition or a reducing condition.

[20] a method for producing a lithium-ion battery comprising producing a lithium metal phosphate by the method as described in any one of [1] to [17].

[21] a method for producing a lithium-ion battery including producing a cathode material for use in a lithium-ion battery by the method as described in [18] or [19].

[22] a lithium metal phosphate in which the lithium metal phosphate is obtained by the method as described in any one of [1] to [17].

[23] the lithium metal phosphate according to [22] in which the lithium site occupancy by a divalent transition metal ion analyzed by X-ray powder diffraction and the Rietveld method (Rietveld Analysis) is 1.5% or lower.

[24] a lithium metal phosphate in which the lithium site occupancy by a divalent transition metal ion analyzed by X-ray powder diffraction and the Rietveld method (Rietveld Analysis) is 1.5% or lower.

[25] a conductive lithium metal phosphate in which the conductive lithium metal phosphate is obtained by coating the lithium metal phosphate as described in any one of [22] to [24] with carbon.

[26] the lithium metal phosphate or the conductive lithium metal phosphate according to any one of [22] to [25] in which a volume average particle diameter $D_{50}$ is 0.01 to 1 μm.

Advantageous Effect of the Invention

According to the method of the present invention, a lithium metal phosphate useful as a cathode active material can be obtained. A lithium-ion battery that comprises, as the cathode material, the lithium metal phosphate obtained by the method of the present invention can have a large capacity.

EMBODIMENTS FOR CARRYING OUT THE INVENTION

The method for producing a lithium metal phosphate in one embodiment according to the present invention comprises initiating and allowing to proceed, in the presence of a polar solvent,
a conversion reaction of a lithium ion (Li$^+$) source, a divalent transition metal ion (M$^{2+}$) source, and a phosphate ion (PO$_4^{3-}$) source into a lithium metal phosphate at 150° C. or higher.

Examples of the polar solvent used in the method according to the present invention include water, methanol, ethanol, 2-propanol, ethylene glycol, propylene glycol, acetone, cyclohexanone, 2-methylpyrrolidone, ethyl methyl ketone, 2-ethoxyethanol, propylene carbonate, ethylene carbonate, dimethyl carbonate, dimethylformamide, dimethylsulfoxide, and the like. Among these, water is preferable. These can be used alone or as a combination of two or more of these.

Examples of a divalent transition metal ion (M$^{2+}$) include an iron ion, a cobalt ion, a nickel ion, a manganese ion, and the like and among these, an iron ion and a manganese ion are preferable. Examples of the divalent transition metal ion source include divalent transition metal sulfates, divalent transition metal chlorides, divalent transition metal fluorides, divalent transition metal bromides, divalent transition metal iodides, divalent transition metal nitrates, divalent transition metal phosphates, divalent transition metal oxalates, divalent transition metal acetates, and the like. The divalent transition metal ion source is preferably a compound that readily dissolves in the polar solvent. Among these, divalent transition metal sulfates are preferable, iron (II) sulfate, iron (II) sulfate hydrates, manganese (II) sulfate, and manganese (II) sulfate hydrates are more preferable.

The lithium ion ($Li^+$) source is preferably a compound that readily dissolves in the polar solvent. Examples thereof include lithium hydroxide, lithium chloride, lithium fluoride, lithium bromide, lithium iodide, lithium oxide, lithium hydrogen sulfate, lithium dihydrogen phosphate, lithium phosphate, lithium carbonate, lithium hydrogen carbonate, and the like. Among these, lithium hydroxide is preferable.

The phosphate ion ($PO_4^{3-}$) source is preferably a compound that readily dissolves in the polar solvent. Examples thereof include phosphoric acid (orthophosphoric acid), metaphosphoric acid, pyrophosphoric acid, triphosphoric acid, tetraphosphoric acid, hydrogen phosphate, dihydrogen phosphate, ammonium phosphate, ammonium phosphate anhydride, ammonium dihydrogen phosphate, diammonium hydrogen phosphate, lithium phosphate, iron phosphate, and the like. Lithium phosphate or divalent transition metal phosphates can also be used as the lithium ion source or the divalent transition metal ion source.

In the method of the present invention, the lithium ion ($Li^+$) source, the divalent transition metal ion ($M^{2+}$) source, and the phosphate ion ($PO_4^{3-}$) source are prepared so as not to practically cause the conversion reaction into a lithium metal phosphate at lower than 150° C. The expression so as not to practically cause the conversion reaction means a condition where a conversion reaction into a lithium metal phosphate such as $LiMPO_4$, which is a hydrothermal synthesis reaction starting from a lithium ion, a divalent transition metal ion, and a phosphate ion, is not caused. Therefore, the conversion reaction does not include a reaction between the phosphate ion source and the lithium ion source, a reaction between the divalent transition metal ion source and the lithium ion source, a reaction between the divalent transition metal ion source and the phosphate ion source, and a similar reaction.

The ion sources are prepared, for example, by a1) preparing solution A containing one of a lithium ion, a divalent transition metal ion, and a phosphate ion and solution B containing the others of these ions so as not to bring the solutions into contact with each other, or by a2) preparing solution C that has a pH of lower than 4 and contains a lithium ion, a divalent transition metal ion, and a phosphate ion.

Specific examples of preparation a1) include an aspect to prepare solution A containing a lithium ion and prepare solution B containing a divalent transition metal ion and a phosphate ion; an aspect to prepare solution A containing a phosphate ion and prepare solution B containing a divalent transition metal ion and a lithium ion; and an aspect to prepare solution A containing a divalent transition metal ion and prepare solution B containing a phosphate ion and a lithium ion. Solution A and solution B are kept from contact with each other, and specifically solution A and solution B are kept so as not to mix with each other. In this way, the conversion reaction into a lithium metal phosphate is not practically caused at lower than 150° C.

Specific examples of preparation a2) include an aspect to add the lithium ion source, the divalent transition metal ion source, and the phosphate ion source to a strongly acidic liquid to prepare solution C; an aspect to mix a highly acidic liquid and a solution containing a lithium ion, and thereto add a solution containing a divalent transition metal ion and a solution containing a phosphate ion to prepare solution C; an aspect to add the lithium ion source, the divalent transition metal ion source, and the phosphate ion source to water at about 80° C. or lower, and thereto add a highly acidic liquid to prepare solution C; and the like. The pH of solution C containing a lithium ion, a divalent transition metal ion, and a phosphate ion is preferably lower than 4. The pH of solution C is maintained at lower than 4 so as not to practically cause the conversion reaction into a lithium metal phosphate at lower than 150° C.

In the preparation of each ion source, a preferable proportion of a lithium ion, a divalent transition metal ion, and a phosphate ion is approximately the same as the stoichiometric proportion in a lithium metal phosphate. According to the method in one embodiment of the present invention, adjusting the proportion of each ion source can give a lithium metal phosphate represented by $Li_xM_yP_zO_4$ (where x is 0.95 to 1.05, y is 0.85 to 1.05, and z is 0.95 to 1.03) as described in Patent Document 4 and Patent Document 5.

Then, the conversion reaction into a lithium metal phosphate is initiated and is allowed to proceed at 150° C. or higher and preferably at 175° C. or higher. Examples of the operation to initiate and allow to proceed the reaction include b1) bringing solution A and solution B into contact with each other and b2) adjusting the pH of solution C to 4 or higher.

In operation b1), solution A and/or solution B obtained in preparation a1) are preferably heated before bringing solution A and solution B into contact with each other. In addition, the temperature of the mixed solution of solution A and solution B at the time of mixing is preferably not lower than 150° C. The temperature of one of the solutions may be lower than 150° C. provided that the temperature of the mixed solution at the time of mixing is 150° C. or more, and in this case, in order to prevent extreme nonuniformity in the temperature, either solution is preferably at 100° C. or higher. The pH of the mixed solution of solution A and solution B at the time of mixing is preferably 4 or higher and is more preferably 7 or higher.

In operation b2), adjustment of the temperature of solution C obtained in preparation a2) to not lower than 150° C. is preferably performed with the pH maintained at lower than 4. When the temperature of solution C is raised at a pH of 4 or higher, the conversion reaction into a lithium metal phosphate is initiated at around 100° C.

In order to adjust the pH of solution C to 4 or higher, a basic liquid, preferably a liquid having a pH of 9 or higher, can be added to solution C. The temperature of the mixed solution of solution C and the basic liquid at the time of addition is preferably not lower than 150° C. The temperature of the basic liquid may be lower than 150° C. provided that the temperature of the mixed solution of solution C and the basic liquid at the time of addition is 150° C. or higher, and in this case, in order to prevent extreme nonuniformity in the temperature, the basic liquid is preferably at 100° C. or higher.

The basic liquid to be added for adjusting the pH of solution C to 4 or higher preferably contains no ion of an alkali metal excluding lithium, that is, no sodium ion nor potassium ion. A lithium-ion battery that contains an ion of an alkali metal excluding lithium tends to be degraded in performance. Examples of the basic liquid include liquids containing ammonia, an amine, lithium hydroxide, or the like.

The conversion reaction into a lithium metal phosphate is carried out preferably at pressure of 0.5 MPa or higher and more preferably at pressure of 1 to 10 MPa. The reaction is, for example, carried out in a pressure-resistant reactor such as an autoclave. Inside the reactor is preferably substituted with an inert gas, and examples of the inert gas include nitrogen, argon, and the like.

After initiating the reaction at 150° C. or higher, the temperature of 150° C. or higher is maintained until the conversion reaction is completed. During the conversion reaction, the mixture is preferably stirred well. By the conversion reaction, a suspension of a lithium metal phosphate can be obtained.

The suspension is cooled for solid-liquid separation. The liquid after separation may contain an unreacted lithium ion or the like, and in this case, the lithium ion source or the like can be recovered from the liquid after separation. The recovery method is not particularly limited. For example, a basic phosphate source was added to the liquid after separation to precipitate lithium phosphate, which can then be recovered to be reused as a lithium ion source or a phosphate ion source.

The solid, which is a lithium metal phosphate, separated from the suspension is washed where appropriate and is dried. Drying conditions are preferably selected so as not to oxidize the divalent transition metal. Drying is preferably performed by vacuum drying.

The lithium metal phosphate can be provided with conductivity by mixing the lithium metal phosphate with a carbon-containing substance, a conductive substance, or a precursor thereof, subjecting the mixture to vacuum drying where appropriate, and then calcining the resultant under an inert condition or a reducing condition preferably at a temperature of 500° C. to 800° C. By calcination, a carbon-coated lithium metal phosphate can be obtained. Calcination conditions are preferably selected so as not to oxidize the divalent transition metal.

Examples of the carbon-containing substance and the conductive substance usable in calcination include carbon black, conductive carbon, a vapor grown carbon fiber, a carbon nanotube, a carbon nanofiber, and the like. As a precursor usable in calcination, various substances such as carbohydrates and the like can be used as long as calcination thereof gives a conductive substance, and a water-soluble organic substance such as sugars, alcohols, and ethers is desirable.

In the lithium metal phosphate of the present invention, the lithium site occupancy by a divalent transition metal ion analyzed by X-ray powder diffraction and the Rietveld method (Rietveld Analysis) is preferably 1.5% or lower, more preferably 1.3% or lower, and further preferably 1.1% or lower. The Rietveld method is a method to hypothetically define a crystal structure model and then refine various parameters (a lattice constant, occupancy, and the like) of the crystal structure by matching the X-ray diffraction pattern derived from the model structure with an X-ray diffraction pattern derived from actual measurement.

A cathode material for use in a lithium-ion battery in one embodiment according to the present invention comprises the lithium metal phosphate obtained by the method described above. The lithium metal phosphate is preferably coated with carbon.

The volume average particle diameter $D_{50}$ of the lithium metal phosphate in the cathode material is preferably 0.01 to 1 μm and more preferably 0.05 to 0.5 μm. The particle diameter of the lithium metal phosphate can be adjusted by controlling the temperature, the pressure, the stirring intensity, and the like in the conversion reaction into a lithium metal phosphate, or by pulverizing and classifying the lithium metal phosphate. The particle diameter can be measured by laser diffraction scattering.

The cathode material for use in a lithium-ion battery may contain a binder, a conductive aid, a compound with ionic conductivity, a thickener, a dispersant, a lubricant, and the like, where appropriate.

Examples of the binder include polyethylenes, polypropylenes, ethylene-propylene copolymers, ethylene-propylene terpolymers, butadiene rubber, styrene-butadiene rubber, butyl rubber, polytetrafluoroethylene, poly(meth) acrylates, poly(vinylidene fluoride), poly(ethylene oxide), polypropylene oxide), polyepichlorohydrin, polyphosphazenes, polyacrylonitrile, and the like.

Examples of the conductive aid include conductive metal powders such as a silver powder and the like; powders of conductive carbon such as furnace black, Ketjenblack, acetylene black and the like; and a carbon nanotube, a carbon nanofiber, a vapor grown carbon fiber, and the like. As the conductive aid, a vapor grown carbon fiber is preferable. The diameter of the vapor grown carbon fiber is preferably not smaller than 5 nm and not greater than 0.2 μm. The ratio of fiber length to fiber diameter is preferably 5 to 1000. The content of vapor grown carbon fiber is preferably 0.1 to 10% by mass relative to the dry mass of the cathode material. Examples of the compound with ionic conductivity include polysaccharides such as chitin and chitosan, crosslinked products of the polysaccharides, and the like.

Examples of the thickener include carboxymethylcellulose, polyvinyl alcohol), and the like.

A lithium-ion battery in one embodiment of the present invention comprises a cathode and an anode. The cathode is formed of the cathode material above by various methods. The cathode usually has a collector stacked thereon for facilitating energization with a terminal, a conductive wire, and the like.

The cathode is obtained, for example, by applying the cathode material in paste form to the collector, followed by drying and performing pressure molding, or by pressure molding of the cathode material in granular form onto the collector. The thickness of the cathode is usually not smaller than 0.04 mm and not greater than 0.15 mm. The pressure to be applied at the time of molding can be adjusted so as to obtain a cathode of any electrode density. The pressure to be applied at the time of molding is preferably about 1 t/cm$^2$ to 3 t/cm$^2$.

Examples of the collector include conductive metal foil, a conductive metal mesh, perforated metal of a conductive metal, and the like. The conductive metal that is used contains copper, aluminum, nickel, and/or the like. The collector used in the cathode preferably contains aluminum.

As the anode, one that is conventionally used in a lithium-ion battery can be used.

The anode is formed of an anode material containing an anode active material such as graphite and the like by various methods, which can be a method similar to that to form the cathode. The anode usually has a collector stacked thereon for facilitating energization with a terminal, a conductive wire, and the like. The collector used in the anode preferably contains copper. The anode material may further contain a conventionally known anode additive.

In the lithium-ion battery, the cathode and the anode are usually immersed in an electrolyte. The electrolyte may be liquid, gel, or solid.

Examples of the liquid electrolyte include a solution of a lithium salt in a nonaqueous solvent. Examples of the lithium salt include $LiClO_4$, $LiPF_6$, $LiAsF_6$, $LiBF_4$, $LiSO_3CF_3$, $CH_3SO_3Li$, $CF_3SO_3Li$, and the like. The nonaqueous solvent in the liquid electrolyte is preferably at least one selected from the group consisting of ethylene carbonate, diethyl carbonate, dimethyl carbonate, methylethyl carbonate, propylene carbonate, butylene carbonate, γ-butyrolactone, and vinylene carbonate.

Examples of the solid electrolyte or the gelled electrolyte include polymer electrolytes such as sulfonated styrene-olefin copolymers, polymer electrolytes containing poly (ethylene oxide) and $MgClO_4$, polymer electrolytes having a trimethylene oxide structure, and the like. The nonaqueous solvent in the polymer electrolytes is preferably at least one selected from the group consisting of ethylene carbonate, diethyl carbonate, dimethyl carbonate, methylethyl carbonate, propylene carbonate, butylene carbonate, γ-butyrolactone, and vinylene carbonate.

Between the cathode and the anode, a separator is provided where appropriate. Examples of the separator include a nonwoven fabric, a woven fabric, a microporous film, etc., a combination thereof, and the like.

The lithium-ion battery according to the present invention has applications in various fields. Examples thereof include electrical and electronic equipment such as personal computers, tablet computers, laptop computers, cellular phones, radios, personal organizers, electronic dictionaries, PDAs (Personal Digital Assistants), electric meters, electronic keys, electronic tags, power storage devices, electric tools, toys, digital cameras, digital videos, AV systems, and vacuum cleaners; transportation such as electric vehicles, hybrid electric vehicles, electric motorcycles, hybrid motorcycles, electric bicycles, electric power-assisted bicycles, railcars, aircrafts, and ships; power generation systems such as solar power systems, wind power systems, tidal power systems, geothermal power systems, power generation systems driven by heat difference, and power generation systems driven by vibration; and the like.

EXAMPLES

The present invention will be described more specifically by examples. The scope of the present invention is, however, not limited to these examples and includes all the aspects derived from one of or a combination of two or more of the technical matters described above.

Example 1

[Preparation]

The following processes were performed in a glove box filled with argon gas.

Argon gas was bubbled into distilled water for 15 hours to prepare deaerated water.

In 300 ml of the deaerated water, 0.65 g of L(+)-ascorbic acid (guaranteed reagent-grade manufactured by KANTO CHEMICAL CO., INC.) was dissolved. Dissolved therein was 55.61 g of $FeSO_4.7H_2O$ (guaranteed reagent-grade manufactured by Wako Pure Chemical Industries, Ltd.). Therein, 23-06 g of $H_3PO_4$ (guaranteed reagent-grade 85.0% aqueous solution manufactured by KANTO CHEMICAL CO., INC.) was then dissolved. The resulting aqueous solution was to be used as solution A1.

In 200 ml of the deaerated water, 25.18 g of $LiOH.H_2O$ (Cica-grade manufactured by KANTO CHEMICAL CO., INC.) was dissolved, and the resulting aqueous solution was to be used as solution B1. Solution B1 had a pH of 14.

Solution A1 was placed in a simplified autoclave (Hyper Glaster TEM-V1000N, which is an SUS316 stainless steel container, manufactured by Taiatsu Techno Corporation), and the lid was closed. The gas-introducing nozzle and the gas-discharging nozzle were opened, and through the gas-introducing nozzle, nitrogen gas was introduced into the autoclave at a flow rate of 1 L/minute for 5 minutes. The gas-discharging nozzle was then closed, and subsequently the gas-introducing nozzle was also closed. Stirring was initiated at a stirring rate of 300 rpm. Heating was initiated with the temperature inside the autoclave set at 180° C. The temperature was raised from room temperature to 180° C. in 1 hour.

A high-pressure injection unit (MDP-300 manufactured by AKICO Corporation) was connected to the autoclave via a piping heater. In the high-pressure injection unit, solution B1 was placed.

[Hydrothermal Synthesis Reaction]

After the temperature of solution A1 in the autoclave reached 150° C., solution B1 in the high-pressure injection unit was injected into the autoclave at 1 mL/minute while maintaining the temperature of solution B1 at 150° C. with the piping heater.

After injection of solution B1, the mixture in the autoclave was stirred at 180° C. for 7 hours. Subsequently, the mixture in the autoclave was cooled to reach room temperature. The mixture after injection of solution B1 had a pH of 7.2.

The suspension was taken out of the autoclave to be subjected to solid-liquid separation with a centrifuge. The supernatant solution was discarded, followed by addition of distilled water and stirring for redispersion. The dispersion was subjected to solid-liquid separation with the centrifuge, followed by discarding the supernatant solution. This operation was repeated until the electric conductivity of the supernatant reached $1\times10^{-1}$ S/cm or lower.

When the electric conductivity of the supernatant reached $1\times10^{-4}$ S/cm or lower, the resulting solid matter was dried in a vacuum dryer controlled at 90° C. to obtain lithium iron phosphate.

The lithium iron phosphate after drying was subjected to diffraction measurement using a Spring-8 BL19B2 beamline, a Lindemann glass capillary with an inner diameter of 0.3 mmϕ and an X-ray with a wavelength of 0.7 Å, followed by analysis by the Rietveld method to calculate the lithium site occupancy by an Fe ion. The occupancy was 0.4%.

[Carbon Coating]

To 10 g of the lithium iron phosphate after drying, 2.15 g of sucrose was added and then 10 mL of distilled water was added, followed by kneading. The resultant was dried in a vacuum dryer controlled at 90° C.

The resultant was milled in a mortar and was then placed on an alumina boat. The alumina boat was placed in a quartz tube furnace of 80 mmϕ. The temperature inside the tube furnace was raised to 400° C. at 100° C./hour while passing nitrogen through the furnace at 1 L/minute. The furnace was maintained under a nitrogen stream at 400° C. for 1 hour. The gas generated from sucrose decomposition was discharged from the system.

Subsequently, the temperature inside the furnace was raised to 700° C. at 100° C./hour under a nitrogen stream, and the furnace was maintained at 700° C. for 4 hours, followed by cooling under a nitrogen stream to reach 100° C. or lower. Thus, carbon-coated lithium iron phosphate was obtained, which was to be used as a cathode active material.

[Battery Evaluation]

Mixed were 5 g of the cathode active material, 1.43 g of acetylene black (HS-100 manufactured by DENKI KAGAKU KOGYO KABUSHIKI KAISHA), and 0.71 g of poly(vinylidene fluoride) (KF polymer W#1300 manufactured by KUREHA CORPORATION) together thoroughly. Thereto, 16.67 g of N-methyl-2-pyrrolidone (manufactured by KISHIDA CHEMICAL Co., Ltd.) was added by a small amount at a time, followed by mixing thoroughly to obtain a coating mixture. The coating mixture was applied to Al foil having a thickness of 15 μm with a doctor blade. N-methyl-2-pyrrolidone was volatilized from the resulting coating. The resultant was cut out into a size of 20 mm×20 mm, and an Al lead of 20 mm×5 mm×15 μm thick was welded to the back surface of the coating. The resultant was to be used as a cathode. The coating had an average thickness of 105 μm and weighed 36 mg.

In a glove box filled with argon gas and maintained to have a dew point of −75° C. or lower, a battery for evaluation was assembled as below.

To an SUS316 stainless steel mesh with a lead, Li foil of 22 mm×22 mm×200 μm thick was pressed into adhesion to obtain an anode.

A separator (Celgard 2400 manufactured by Hoechst Celanese Corporation) of 30 mm×50 mm was folded in half to cover the anode.

The cathode and the anode that was covered with the separator were overlaid one another with the coated surface of the cathode and the Li foil surface of the anode facing each other, and the resultant was sandwiched between two glass plates of 30 mm×30 mm×1 mm.

The resultant was placed in a 30-ml hermetically sealed glass container, and each load of the cathode and the anode was immobilized with an alligator clip that was connected to the exterior of the hermetically sealed glass container. An electrolyte solution (1 M LiPF$_6$ EC:MEC=30:70) was added to the hermetically sealed glass container so that the part sandwiched between the glass plates was completely immersed. The resultant was to be used as a battery for evaluation.

The battery for evaluation was taken out of the glove box and was left still standing for 2 hours at room temperature, followed by a charge-discharge test. The charge-discharge test was carried out as below. Charging was performed at 0.04 mA, and from the point when 4.2 V was reached, charging was paused for 10 minutes. Discharging followed at 0.04 mA and when 2.0 V was reached, discharging was paused for 10 minutes. These were repeated. The discharge capacity during the 2nd charge-and-discharge operation was 158 mAh/g per unit weight of the cathode active material.

TABLE 1

|  |  | Discharge capacity during 2nd operation [mAh/g] | Li site occupancy by Fe or Mn [%] |
|---|---|---|---|
| Example | 1 | 158 | 0.4 |
|  | 2 | 152 | 0.9 |
|  | 3 | 152 | 1.0 |
|  | 4 | 157 | 0.6 |
|  | 5 | 159 | 0.2 |
|  | 6 | 161 | 0.1 |

TABLE 1-continued

|  |  | Discharge capacity during 2nd operation [mAh/g] | Li site occupancy by Fe or Mn [%] |
|---|---|---|---|
|  | 7 | 152 | 0.9 |
|  | 8 | 158 | 0.3 |
| Comparative | 1 | 144 | 1.6 |
| Example | 2 | 142 | 2.2 |

Example 2

Carbon-coated lithium iron phosphate was obtained in the same manner as in Example 1 except that the temperature inside the autoclave (the temperature of solution A1) was set at 150° C. The carbon-coated lithium iron phosphate was used to assemble a battery, followed by evaluation. Results are shown in Table 1.

Comparative Example 1

Carbon-coated lithium iron phosphate was obtained in the same manner as in Example 1 except that the temperature inside the autoclave (the temperature of solution A1) was set at 140° C. The carbon-coated lithium iron phosphate was used to assemble a battery, followed by evaluation. Results are shown in Table 1

Example 3

To solution B1 prepared in Example 1, sulfuric acid was added, followed by adjusting the pH to 9.1 to obtain solution B2. Carbon-coated lithium iron phosphate was obtained in the same manner as in Example 1 except that solution B2 was used instead of solution B1. The carbon-coated lithium iron phosphate was used to assemble a battery, followed by evaluation. Results are shown in Table 1. The mixture after injection of solution B2 had a pH of 4.0.

Example 4

Solution A1, solution B1, and 10 ml of 1-N sulfuric acid were placed in a simplified autoclave (Hyper Glaster TEM-V1000N, which is an SUS316 stainless steel container, manufactured by Taiatsu Techno Corporation), and the lid was closed. The mixed solution had a pH of 3.3.

The gas-introducing nozzle and the gas-discharging nozzle were opened, and through the gas-introducing nozzle, nitrogen gas was introduced into the autoclave at a flow rate of 1 L/minute for 5 minutes. The gas-discharging nozzle was then closed, and subsequently the gas-introducing nozzle was also closed. Stirring was initiated at a stirring rate of 300 rpm. Heating was initiated with the temperature inside the autoclave set at 180° C. The temperature was raised from room temperature to 180° C. in 1 hour.

A high-pressure injection unit (MDP-300 manufactured by AKICO Corporation) was connected to the autoclave via a piping heater. In the high-pressure injection unit, 50 ml of a 1-N aqueous ammonia solution was placed.

After the temperature of the mixed solution in the autoclave reached 180° C., the aqueous ammonia solution in the high-pressure injection unit was injected into the autoclave at 1 mL/minute while maintaining the temperature of the aqueous ammonia solution at 150° C. with the piping heater.

After injection of the aqueous ammonia solution, the mixture in the autoclave was stirred at 180° C. for 7 hours.

Subsequently, the mixture in the autoclave was cooled to reach room temperature. The mixture after injection of the aqueous ammonia solution had a pH of 10.6.

The rest of the processes were performed in the same manner as in Example 1 to obtain carbon-coated lithium iron phosphate, which was used to assemble a battery, followed by evaluation. Results are shown in Table 1.

Example 5

In 300 ml of the deaerated water, 0.65 g of L(+)-ascorbic acid (guaranteed reagent-grade manufactured by KANTO CHEMICAL CO., INC.) was dissolved. Therein, 55.61 g of $FeSO_4.7H_2O$ (guaranteed reagent-grade manufactured by Wako Pure Chemical Industries, Ltd.) was dissolved. The resulting aqueous solution was to be used as solution A3.

In 200 ml of the deaerated water, 25.18 g of $LiOH.H_2O$ (Cica-grade manufactured by KANTO CHEMICAL CO., INC.) was dissolved. The resulting aqueous solution was to be used as solution B3. The pH measured was 14.

Solution A3 and solution B3 were placed in a simplified autoclave (Hyper Glaster TEM-V1000N, which is an SUS316 stainless steel container, manufactured by Taiatsu Techno Corporation), and the lid was closed. The mixed solution had a pH of 13.1. The gas-introducing nozzle and the gas-discharging nozzle were opened, and through the gas-introducing nozzle, nitrogen gas was introduced into the autoclave at a flow rate of 1 L/minute for 5 minutes. The gas-discharging nozzle was then closed, and subsequently the gas-introducing nozzle was also closed. Stirring was initiated at a stirring rate of 300 rpm. Heating was initiated with the temperature inside the autoclave set at 180° C. The temperature was raised from room temperature to 180° C. in 1 hour.

A high-pressure injection unit (MDP-300 manufactured by AKICO Corporation) was connected to the autoclave via a piping heater. In the high-pressure injection unit, 23.06 g of $H_3PO_4$, phosphoric acid (guaranteed reagent-grade 85.0% aqueous solution manufactured by KANTO CHEMICAL CO., INC.) was placed.

After the temperature of the mixed solution in the autoclave reached 180° C., the phosphoric acid in the high-pressure injection unit was injected into the autoclave at 1 mL/minute while maintaining the temperature of the phosphoric acid at 150° C. with the piping heater.

After injection of the phosphoric acid, the mixture in the autoclave was stirred at 180° C. for 7 hours. Subsequently, the mixture in the autoclave was cooled to reach room temperature. The mixture after injection of the phosphoric acid had a pH of 7.2.

The rest of the processes were performed in the same manner as in Example 1 to obtain carbon-coated lithium iron phosphate, which was used to assemble a battery, followed by evaluation. Results are shown in Table 1.

Example 6

In 200 ml of the deaerated water, 25.18 g of $LiOH.H_2O$ (Cica-grade manufactured by KANTO CHEMICAL CO., INC.) was dissolved, and thereto, 23.06 g of $H_3PO_4$ (guaranteed reagent-grade 85.0% aqueous solution manufactured by KANTO CHEMICAL CO., INC.) was added, which was to be used as solution A4.

In 300 ml of the deaerated water, 0.65 g of L(+)-ascorbic acid (guaranteed reagent-grade manufactured by KANTO CHEMICAL CO., INC.) was dissolved, and thereto, 55.61 g of $FeSO_4.7H_2O$ (guaranteed reagent-grade manufactured by Wako Pure Chemical Industries, Ltd.) was dissolved. The resulting aqueous solution was to be used as solution B4.

solution A4 was placed in a simplified autoclave (Hyper Glaster TEM-V1000N, which is an SUS316 stainless steel container, manufactured by Taiatsu Techno Corporation), and the lid was closed. The gas-introducing nozzle and the gas-discharging nozzle were opened, and through the gas-introducing nozzle, nitrogen gas was introduced into the autoclave at a flow rate of 1 L/minute for 5 minutes. The gas-discharging nozzle was then closed, and subsequently the gas-introducing nozzle was also closed. Stirring was initiated at a stirring rate of 300 rpm. Heating was initiated with the temperature inside the autoclave set at 180° C. The temperature was raised from room temperature to 180° C. in 1 hour.

A high-pressure injection unit (MDP-300 manufactured by AKICO Corporation) was connected to the autoclave via a piping heater. In the high-pressure injection unit, solution B4 was placed.

After the temperature of solution A4 in the autoclave reached 180° C., solution B4 in the high-pressure injection unit was injected into the autoclave at 1 mL/minute while maintaining the temperature of solution B4 at 150° C. with the piping heater.

After injection of solution B4, the mixture in the autoclave was stirred at 180° C. for 7 hours. Subsequently, the mixture in the autoclave was cooled to reach room temperature. The mixture after injection of solution B4 had a pH of 7.2.

The rest of the processes were performed as in Example 1 to obtain carbon-coated lithium iron phosphate, which was used to assemble a battery, followed by evaluation. Results are shown in Table 1.

Example 7

Lithium manganese phosphate was obtained in the same manner as in Example 1 except that 48.22 g of $MnSO_4.5H_2O$ (guaranteed reagent-grade manufactured by Wako Pure Chemical Industries, Ltd.) was used instead of 55.61 g of $FeSO_4.7H_2O$ (guaranteed reagent-grade manufactured by Wako Pure Chemical Industries, Ltd.). The mixture after injection of solution B1 had a pH of 7.1.

The lithium manganese phosphate after drying was subjected to diffraction measurement using a Spring-8 BL19B2 beamline, a Lindemann glass capillary with an inner diameter of 0.3 mmφ, and an X-ray with a wavelength of 0.7 Å, followed by analysis by the Rietveld method to calculate the lithium site occupancy by an Mn ion. The occupancy was 0.0%.

Carbon-coated lithium manganese phosphate was obtained in the same manner as in Example 1 except that the lithium manganese phosphate after drying was used instead of lithium iron phosphate. The carbon-coated lithium manganese phosphate was used to assemble a battery, followed by evaluation. The discharge capacity during the 2nd charge-and-discharge operation was 152 mAh/g per unit weight of the cathode active material.

Example 8

In a simplified autoclave (Hyper Glaster TEM-V1000, which is an SUS316 stainless steel container, manufactured by Taiatsu Techno Corporation), 100 ml of the deaerated water was placed, and the lid was closed. The gas-introducing nozzle and the gas-discharging nozzle were opened, and through the gas-introducing nozzle, nitrogen gas was introduced into the autoclave at a flow rate of 1 L/minute for 5 minutes. The gas-discharging nozzle was then closed, and subsequently the gas-introducing nozzle was also closed. Stirring was initiated at a stirring rate of 300 rpm. Heating was initiated with the temperature inside the autoclave set at 180° C. The temperature was raised from room temperature to 130° C. in 1 hour.

High-pressure injection unit A (MDP-300 manufactured by AKICO Corporation) was connected to the autoclave via a piping heater. In high-pressure injection unit A, solution A1 prepared in Example 1 was placed. High-pressure injection unit B (MDP-300 manufactured by AKICO Corporation) was connected to the autoclave via a piping heater. In high-pressure injection unit B, solution B1 prepared in Example 1 was placed.

After the water temperature in the autoclave reached 180° C., solution A1 in high-pressure injection unit A was injected into the autoclave at 1.5 mL/minute while maintaining the temperature of solution A1 at 150° C. with the piping heater. Simultaneously, solution B1 in high-pressure injection unit B was injected into the autoclave at 1 mL/minute while maintaining the temperature of solution B1 at 150° C. with the piping heater.

After injection of solution A1 and solution B1, the mixture in the autoclave was stirred at 180° C. for 7 hours. Subsequently, the mixture in the autoclave was cooled to reach room temperature. The mixture after injection of solution A1 and solution B1 had a pH of 7.1.

The rest of the processes were performed in the same manner as in Example 1 to obtain carbon-coated lithium iron phosphate, which was used to assemble a battery, followed by evaluation. Results are shown in Table 1.

Comparative Example 2

Solution A1 and solution B1 prepared in Example 1 were placed in a simplified autoclave (Hyper Glaster TEM-V1000N, which is an SUS316 stainless steel container, manufactured by Taiatsu Techno Corporation), and the lid was closed. The mixture in the autoclave had a pH of 7.2. The gas-introducing nozzle and the gas-discharging nozzle were opened, and through the gas-introducing nozzle, nitrogen gas was introduced into the autoclave at a flow rate of 1 L/minute for 5 minutes. The gas-discharging nozzle was then closed, and subsequently the gas-introducing nozzle was also closed. Stirring was initiated at a stirring rate of 300 rpm. Heating was initiated with the temperature inside the autoclave set at 180° C. The temperature was raised from room temperature to 180° C. in 1 hour, and the system was maintained at 180° C. for 7 hours while stirring. Subsequently, the mixture in the autoclave was cooled to reach room temperature.

The rest of the processes were performed in the same manner as in Example 1 to obtain carbon-coated lithium iron phosphate, which was used to assemble a battery, followed by evaluation. Results are shown in Table 1.

As shown in Table 1, in the lithium metal phosphate (in each Example) according to the method of the present invention, the lithium site occupancy by a divalent transition metal ion was low. The lithium-ion battery comprising, as the cathode active material, the lithium metal phosphate obtained in each Example had a large discharge capacity.

The invention claimed is:

1. A method for producing a lithium metal phosphate by a conversion reaction of lithium ion ($Li+$) source, a divalent transition metal ion ($M2+$) source, and a phosphate ion ($PO4 3-$) source, the method comprising:
preparing solution C having a pH of lower than 4 and a temperature of less than 150° C., and containing a lithium ion, a divalent transition metal ion, and a phosphate ion,
heating the solution C at 150° C. or higher while the pH is lower than 4,
adding a basic liquid to the solution C at 150° C. or higher for elevating the pH from less than 4 to not less than 4 in the presence of a polar solvent while maintaining the temperature of 150° C. or higher to initiate the conversion reaction, and
subsequently maintaining the temperature of 150° C. or higher and the pH of 4 or higher to continue the conversion reaction.

2. The method for producing a lithium metal phosphate according to claim 1, wherein
the basic liquid is a liquid having a pH of 9 or higher.

3. The method for producing a lithium metal phosphate according to claim 1, wherein
the lithium ion source is lithium hydroxide, the divalent transition metal ion source is a divalent transition metal sulfate, and the phosphate ion source is a phosphoric acid.

4. The method for producing a lithium metal phosphate according to claim 1, wherein
the divalent transition metal ion is at least one selected from a group consisting of an iron ion and a manganese ion.

5. The method for producing a lithium metal phosphate according to claim 1, wherein
the conversion reaction is carried out under a pressure of 0.5 MPa or higher.

* * * * *